United States Patent
Inokuchi et al.

(10) Patent No.: US 7,224,144 B2
(45) Date of Patent: May 29, 2007

(54) CONTROL OF VEHICLE GENERATOR USING PWM SIGNAL WITH SPECIALLY DETERMINED DUTY AND FREQUENCY

(75) Inventors: Takatoshi Inokuchi, Kariya (JP); Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/226,362

(22) Filed: Sep. 15, 2005

(65) Prior Publication Data
US 2006/0061335 A1 Mar. 23, 2006

(30) Foreign Application Priority Data
Sep. 15, 2004 (JP) ............................. 2004-268195

(51) Int. Cl.
- H02H 7/06 (2006.01)
- H02P 9/00 (2006.01)
- H02P 11/00 (2006.01)

(52) U.S. Cl. ............................. 322/24; 322/28; 322/37
(58) Field of Classification Search .................. 322/24, 322/26, 28, 37; 363/89
See application file for complete search history.

(56) References Cited

U.S. PATENT DOCUMENTS

| 4,641,079 | A | * | 2/1987 | Kato et al. .................. 320/123 |
| 5,294,879 | A | * | 3/1994 | Freeman et al. ............... 322/23 |
| 6,275,398 | B1 | * | 8/2001 | Sumimoto et al. ............ 363/89 |
| 6,671,195 | B2 | * | 12/2003 | Perreault et al. .............. 363/89 |
| 6,696,820 | B2 | * | 2/2004 | Peter ........................... 322/24 |
| 6,850,043 | B1 | * | 2/2005 | Maddali ....................... 322/25 |
| 6,912,142 | B2 | * | 6/2005 | Keim et al. ................... 363/89 |
| 7,009,365 | B1 | * | 3/2006 | Namuduri et al. ............ 322/23 |
| 7,106,029 | B2 | * | 9/2006 | Inokuchi et al. .............. 322/28 |

FOREIGN PATENT DOCUMENTS

| JP | A 63-206125 | 8/1988 |
| JP | A 11-146698 A2 | 5/1999 |
| JP | A 2002-10515 A2 | 1/2002 |

* cited by examiner

Primary Examiner—Julio C. Gonzalez
(74) Attorney, Agent, or Firm—Oliff & Berridge PLC (57) ABSTRACT

A control apparatus for a vehicle generator includes a switch, a regulator, a fault condition detector, and a PWM signal generator. The switch is selectively turned on and off so as to intermittently excite the generator. The regulator controls on/off operation of the switch so as to bring an output of the generator into agreement with a target value. The fault condition detector detects a fault condition of the generator. The PWM signal generator generates and outputs a PWM signal that has a duty determined as a function of a duty of the on/off operation of the switch and a frequency determined based on if the fault condition of the generator is detected by the fault condition detector. Consequently, the control apparatus can inform an external control apparatus of the duty of the on/off operation of the switch and the fault condition of the generator with the single PWM signal.

6 Claims, 5 Drawing Sheets

CONTROL OF VEHICLE GENERATOR USING PWM SIGNAL WITH SPECIALLY DETERMINED DUTY AND FREQUENCY

CROSS-REFERENCE TO RELATED APPLICATION

This application claims priority from Japanese Patent Application No. 2004-268195, filed on Sep. 15, 2004, the content of which is hereby incorporated by reference into this application.

BACKGROUND OF THE INVENTION

1. Technical Field of the Invention

The present invention relates generally to generators and electric power generation systems for motor vehicles. More particularly, the invention relates to a control apparatus for a vehicle generator, which provides information about operation of the generator to an external control apparatus using a PWM (Pulse Width Modulated) signal that has a duty and a frequency both of which are specially determined.

2. Description of the Related Art

Several methods have been proposed to provide an external control apparatus with information about operation of a vehicle generator, such as fault conditions of the generator.

For example, Japanese Patent First Publication No. 2002-10515 discloses a control apparatus for a vehicle generator (or alternator), which is configured to send, via a single signal line, to an external control apparatus (or unit) both a first signal indicative of a duty of a transistor for controlling a field current supply to the generator and a second signal indicative of a fault condition (abnormality occurrence status) with the generator. Specifically, the control apparatus sends to the external control apparatus the first signal when the generator is in normal condition and the second signal when it is in the fault condition.

However, the above control apparatus cannot concurrently inform the external control apparatus of the duty of the transistor and the fault condition of the generator with a single signal, since the second signal is configured to have a low level. Further, the electric potential of the signal line will drop to a low level when the signal line is short-circuited to the ground. Thus, it is impossible for the external control apparatus to distinguish the fault condition of the generator from that of the signal line.

Japanese Patent First Publication No. H11-146698 discloses a control apparatus for a vehicle generator, which is configured to send, via a single signal line, to an external control apparatus (or vehicle ECU) a PWM signal that is indicative of both a duty of a transistor for controlling a field current supply to the generator and a rotational speed of the generator. Specifically, the PWM signal has a duty determined as a function of the duty of the transistor and a frequency determined as a function of the rotational speed of the generator.

However, in the above case, the frequency of the PWM signal varies with the rotational speed of the generator. Consequently, when a PWM command signal, which is indicative of a command for control of the generator determined based on the PWM signal, is sent from the external control apparatus to the control apparatus, there will be a difference in frequency between the two PWM signals that varies with time. As a result, the relationship between the reception time of the PWM signal and transmission time of the PWM command signal for the external control apparatus will also vary with time, thus causing instability of the whole electric power generation system of the vehicle.

Further, the control apparatus is also configured to send to the external control apparatus a high level or a low level signal when the generator is in fault conditions. However, the electric potential of the signal line will also become high or low when the signal line is open-circuited or short-circuited. Thus, it is impossible for the external control apparatus to distinguish fault conditions of the generator from those of the signal line.

Japanese Patent First Publication No. S63-206125 discloses a control apparatus for a vehicle generator, which is configured to alternately energize a charge lamp and a choke heater by allowing a switch to have a prescribed duty when the generator is in fault conditions. With such a configuration, the choke heater is allowed to be supplied with electric power even when the generator is in fault conditions, thus preventing malfunction of the vehicle engine due to any stop of electric power supply to the choke heater.

However, the above control apparatus informs all the fault conditions of the generator only through the flashing on and off of the charge lamp, so it is impossible to identify different types of fault conditions. Further, the fault conditions of the generator are not informed to an external control apparatus, which may, otherwise, perform suitable vehicle controls based on the different types of fault conditions.

SUMMARY OF THE INVENTION

The present invention has been made in view of the above-mentioned problems.

It is, therefore, the first object of the present invention to provide a control apparatus for a vehicle generator (or alternator), which can inform an external control apparatus of a duty of a switch for controlling a field current supply to the generator and fault conditions of the generator using a single signal and enable the external control apparatus to distinguish fault conditions of the generator from those of a signal line connecting the two control apparatuses.

It is the second object of the present invention to enable the control apparatus to identify different types of fault conditions of the generator, so that the external control apparatus can perform suitable vehicle controls based on the different types of fault conditions of the generator.

It is the third object of the present invention to provide an electric power generation system that includes the control apparatus and has high stability.

According to the first aspect of the present invention, a control apparatus for a generator of a vehicle is provided, which includes a switch, a regulator, a fault condition detector, and a PWM signal generator.

The switch is configured to be selectively turned on and off so as to intermittently excite the generator.

The regulator works to control on/off operation of the switch so as to bring an output of the generator into agreement with a target value.

The fault condition detector works to detect a fault condition of the generator.

The PWM signal generator works to generate and output a PWM signal that has a duty determined as a function of a duty of the on/off operation of the switch and a frequency determined based on if the fault condition of the generator is detected by the fault condition detector.

With such a configuration, it is possible for the control apparatus to inform an external control apparatus of the duty of the on/off operation of the switch and whether the generator is in the fault condition with the single PWM signal.

Further, it is possible for the external control apparatus to distinguish the fault condition of the generator from a fault condition of a signal line through which the PWM signal is sent from the control apparatus to the external control apparatus.

Preferably, the control apparatus further includes a frequency determiner. Further, it is preferable that the fault condition detector identifies a type of fault condition of the generator if a fault condition is detected, and the frequency determiner determines the frequency of the PWM signal based on the type of fault condition of the generator identified by the fault condition detector.

As a result, the external control apparatus can determine the type of the fault condition of the generator based on the frequency of the PWM signal.

According to the second aspect of the present invention, an electric power generation system for a vehicle is provided, which includes a generator, a first control apparatus, and a second control apparatus that is electrically connected with the first control apparatus.

The first control apparatus includes a switch, a regulator, a fault condition detector, and a PWM signal generator. The switch is configured to be selectively turned on and off so as to intermittently excite the generator. The regulator works to receive a target output signal, which has a specific frequency and is indicative of a target value of an output of the generator, and control on/off operation of the switch so as to bring the output of the generator into agreement with the target value. The fault condition detector works to detect a fault condition of the generator. The PWM signal generator works to generate and send to the second control apparatus a PWM signal that has a duty determined as a function of a duty of the on/off operation of the switch and a frequency determined based on if the fault condition of the generator is detected by the fault condition detector.

The second control apparatus includes a target output determiner, which works to receive the PWM signal sent from the PWM signal generator of the first control apparatus, determine the target value of the output of the generator based on the PWM signal, and generate and send to the regulator of the first control apparatus the target output signal.

With the above configuration, the second control apparatus can determine the target value of the output of the generator based on the duty of the on/off operation of the switch and a determination result about if the fault condition of the generator is detected. Consequently, the electric power generation system can operate with high stability.

Preferably, in the above electric power generation system, the first control apparatus further includes a frequency determiner, and the second control apparatus further includes a fault condition type determiner and a vehicle controller. Further, it is preferable that:

the fault condition detector of the first control apparatus identifies a type of the fault condition of the generator if the fault condition is detected;

the frequency determiner determines the frequency of the PWM signal based on the type of the fault condition of the generator identified by the fault condition detector;

the fault condition type determiner determines the type of the fault condition of the generator based on the frequency of the PWM signal sent from the PWM signal generator of the first control apparatus; and the vehicle controller controls the vehicle based the type of the fault condition of the generator determined by the fault condition type determiner.

As a result, the second control apparatus can determine the type of the fault condition of the generator and perform a suitable vehicle control based on the type of fault condition.

It is preferable that, in the above electric power generation system, the frequency of the PWM signal generated by the PWM signal generator of the first control apparatus is m times the frequency of the target output signal generated by the target output determiner of the second control apparatus, where m is an integer greater than zero. Otherwise, it is preferable that the frequency of the PWM signal is 1/n times the frequency of the target output signal, where n is an integer greater than zero.

As a result, it becomes easy to synchronize the frequency of the PWM signal with that of the target output signal, thus improving the stability of the electric power generation system.

Further, in the case where the frequency of the PWM signal is m times the frequency of the target output signal, it is preferable that the second control apparatus further includes a duty detector working to detect the duty of the on/off operation of the switch of the first control apparatus through averaging the duty of the PWM signal sent from the PWM signal generator of the first control apparatus for m cycles.

As a result, in the second control apparatus, the detection time of the duty of the on/off operation of the switch can be exactly synchronized with the transmission time of the target output signal, thus preventing delay in system control.

BRIEF DESCRIPTION OF THE DRAWINGS

The present invention will be understood more fully from the detailed description given hereinafter and from the accompanying drawings of the preferred embodiment of the invention, which, however, should not be taken to limit the invention to the specific embodiment but are for the purpose of explanation and understanding only.

In the accompanying drawings.

DESCRIPTION OF THE PREFERRED EMBODIMENT

The preferred embodiment of the present invention will be described hereinafter with reference to FIGS. 1–5.

It should be noted that, for the sake of clarity and understanding, identical components having identical functions in each of the figures have been marked with the same reference numerals.

Figure 1:
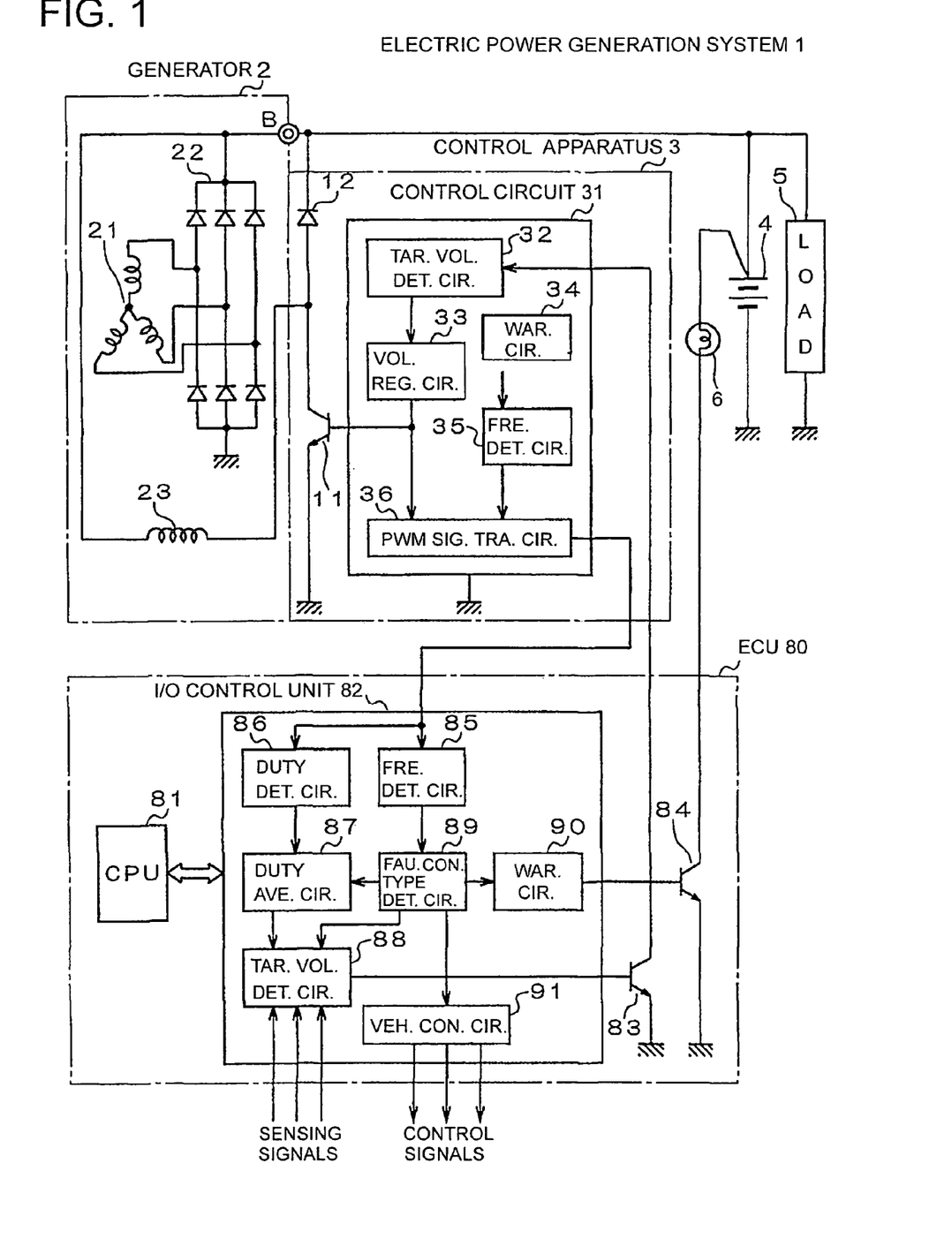
FIG. 1 is a schematic view showing the overall configuration of an electric power generation system according to an embodiment of the invention.

FIG. 1 shows the overall configuration of an electric power generation system 1 according to an embodiment of the present invention. The electric power generation system 1 is for use in a motor vehicle.

As shown in FIG. 1, the electric power generation system 1 includes a generator (or alternator) 2, a control apparatus 3, and an ECU (Electrical Control Unit) 80.

The generator 2 includes a three-phase stator winding 21, a rectification circuit 22, and a field winding 23. The stator winding 21 and filed winding 23 are respectively provided on a stator and a rotor of the generator 2. The rectification circuit 22 is configured to full-wave rectify the three-phase AC output of the stator winding 21 so as to obtain a DC output.

The generator 2 also includes an output terminal B that is connected to a battery 4 and an electrical load 5, so that the battery 4 and electrical load 5 can be supplied with electric current necessary for charge and operation from the generator 2.

The control apparatus 3 is configured to control an electric current (i.e., field current) supply to the field winding 23 of the generator 2, so as to bring the output voltage of the generator 2 into agreement with a target voltage, for example, of 14 V.

The control apparatus 3 includes a power transistor 11, a freewheeling diode 12, and a control circuit 31. The control apparatus 3 is electrically connected, via prescribed signal lines, to the ECU 80 that is an external control apparatus with respect to the control apparatus 3.

The power transistor 11 is connected in series with the field winding 23 of the generator 2, so that the field winding 23 can be supplied with the filed current if the power transistor 11 is switched on. On the other hand, the freewheeling diode 23 is connected in parallel with the field winding 23, so that the field current flowing in the field winding 23 can be recovered when the power transistor 11 is switched from on to off.

The control circuit 31 works to control on/off operation of the power transistor 11 and detect fault conditions of the generator 2; it also works to send to and receive from the ECU 80 signals that are to be described below. The control circuit 31 includes a target voltage detecting circuit 32, a voltage regulating circuit 33, a warning circuit 34, a frequency determining circuit 35, and a PWM signal transmitting circuit 36.

The target voltage detecting circuit 32 works to receive a target voltage signal sent from the ECU 80 and detect a target voltage necessary for the output voltage control of the generator 2 based on the received signal. The target voltage signal is a PWM signal, the duty of which indicates the target voltage.

The voltage regulating circuit 33 works to control the on/off operation of the power transistor 11, so as to bring the output voltage of the generator 2 into agreement with the target voltage detected by the target voltage detecting circuit 32. Specifically, the voltage regulating circuit 33 works to control the duty of the on/off operation of the power transistor 11 and output a duty signal that is indicative of the duty of the on/off operation of the power transistor 11.

The warning circuit 34 works to detect fault conditions of the generator 2, identify the type of a fault condition when it is detected, and output a warning signal indicative of the identified fault condition type. The fault conditions of the generator 2 includes, for example, an "over voltage" and an "under voltage" of the generator 2. The over voltage of the generator 2 here denotes that the output voltage of the generator 2 exceeds an upper limit of a normal range thereof; the under voltage denotes that the output voltage dropped below a lower limit of the normal range.

The frequency determining circuit 35 works to determine, when a fault condition of the generator 2 is detected by the warning circuit 34, the frequency of a PWM signal that is to be sent from the control apparatus 3 to the ECU 80, based on the warning signal outputted from the warning circuit 34. The frequency of the PWM signal when a fault condition of the generator 2 is detected is so determined as to be different from that when the generator 2 is in normal condition. Further, the frequency of the PWM signal is so determined as to be m times that of the target voltage signal sent from the ECU 80, where m is an integer greater than zero. For example, when the generator 2 is in normal condition, the frequency of the PWM signal is so determined as to be 1f, where f is the frequency of the target voltage signal. Further, when the over voltage of the generator 2 is detected, the frequency of the PWM signal is so determined as to be 2f. Similarly, when the under voltage of the generator 2 is detected, the frequency of the PWM signal is so determined as to be 3f. The frequency determining circuit 35 also works to output a frequency signal indicative of the determined frequency of the PWM signal.

The PWM signal transmitting circuit 36 works to generate the PWM signal based on the duty signal outputted from the voltage regulating circuit 33 and the frequency signal outputted from the frequency determining circuit 35 such that the PWM signal has a duty equal to that of the on/off operation of the power transistor 11 and a frequency of mf. The PWM signal transmitting circuit 36 also works to output the PWM signal, via a prescribed signal line, to the ECU 80.

The ECU 80 includes a CPU (Central Processing Unit) 81, an I/O (Input/output) control unit 82, and transistors 83 and 84.

The CPU 81 works to perform various controls in the ECU 80 in accordance with a program installed in a memory (not shown) of the ECU 80.

The I/O control unit 82 is configured to detect operation condition of the generator 2 based on the PWM signal sent from the control apparatus 3 and determine the type of a fault condition of the generator 2 when it is detected. Further, the I/O control unit 82 works to send the target voltage signal to the control apparatus 3 through controlling on/off operation of the transistor 83 and light up a charge lamp 6 through switching on the transistor 84 when a fault condition of the generator 2 is detected. Furthermore, the control unit 82 works to input various sensing signals outputted from various vehicle sensors, such as a vehicle speed sensor and a temperature sensor, and perform various vehicle controls based on the PWM signal and the sensing signals.

The I/O control unit 82 includes a frequency detecting circuit 85, a duty detecting circuit 86, a duty averaging circuit 87, a target voltage determining circuit 88, a fault condition type determining circuit 89, a warning circuit 90, and a vehicle controlling circuit 91.

The frequency detecting circuit 85 works to detect the frequency of the PWM signal sent from the control apparatus 3. On the other hand, the duty detecting circuit 86 works to detect the duty of the PWM signal.

The duty averaging circuit 87 works to average the duty of the PWM signal detected by the duty detecting circuit 86 when it receives an average command signal sent from the fault condition type determining circuit 89.

The target voltage determining circuit 88 works to determine the target voltage necessary for the output voltage control of the generator 2 based on the duty of the PWM signal and various parameters represented by the sensing signals, such as the vehicle speed. Further, the target voltage determining circuit 88 works to generate and send to the target voltage detecting circuit 32 of the control apparatus 3 the target voltage signal, through controlling the on/off operation of the transistor 83 using a duty determined as a function of the target voltage and a specific frequency of f. Consequently, the target voltage signal is indicative of the target voltage and has the specific frequency f.

The fault condition type determining circuit 89 works to determine, when the frequency of the PWM signal detected by the frequency detecting circuit 85 is not equal to f, the type of a fault condition of the generator 2 and output a fault signal indicative of the determined fault condition type. Further, the fault condition type determining circuit 89 works to output the average command signal to the duty averaging circuit 87 when the frequency of the PWM signal detected by the frequency detecting circuit 85 is mf and m is greater than 1.

The warning circuit 90 works to switch on the transistor 84 based on the fault signal outputted from the fault condition type determining circuit 89, thereby lighting up the charge lamp 6.

The vehicle controlling circuit 91 works to perform various vehicle controls based on the fault signal outputted from the fault condition type determining circuit 89. For example, when the determined fault condition type is the over voltage of the generator 2, the vehicle controlling circuit 91 performs such a control to decrease the output voltage of the generator 2 as turning on electric loads not directly pertaining to the vehicle running including head lights. On the contrary, when the determined fault condition type is the under voltage of the generator 2, the vehicle controlling circuit 91 performs such a control to increase the idling speed of the engine if the vehicle is stopped. Further, when the determined fault condition type is the stop of the electric power generation, the vehicle controlling circuit 91 performs such a control to decrease electrical power consumption as turning off the electrical loads not directly pertaining to the vehicle running.

Having described the overall configuration of the electric power generation system 1, operation thereof will be described hereinafter.

Figure 2:
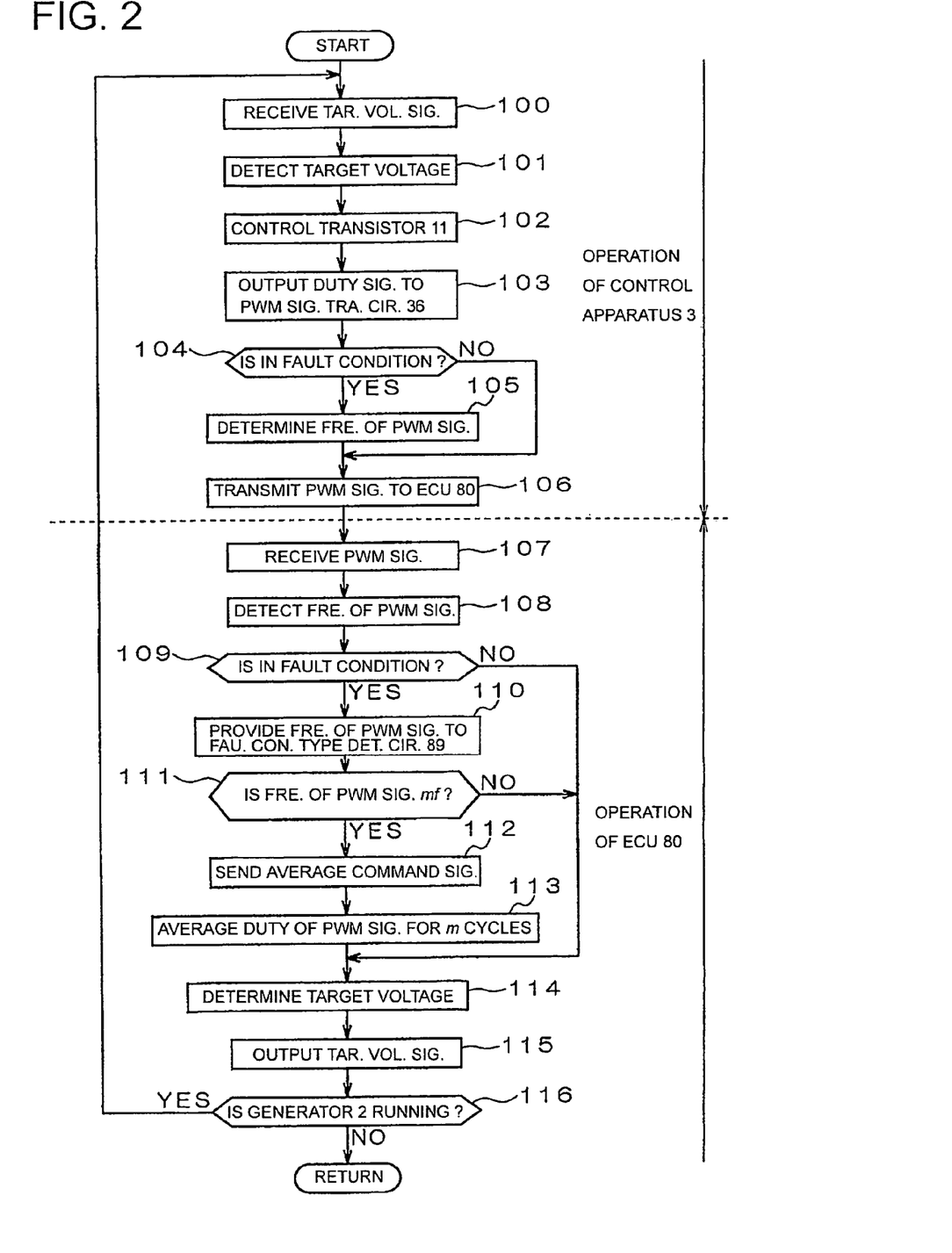
FIG. 2 is a flow chart illustrating a control for electric power generation for the electric power generation system of FIG. 1.

FIG. 2 illustrates the electric power generation control for the electric power generation system 1.

The control apparatus 3 first starts to operate. Then, the target voltage detecting circuit 32 in the control circuit 31 receives the target voltage signal sent from the ECU 80, as indicated at step 100, and detects the target voltage necessary for the output voltage control of the generator 2 based on the received signal, as indicated at step 101.

The voltage regulating circuit 33 controls the duty of the on/off operation of the power transistor 11 so as to bring the output voltage of the generator 2 into agreement with the target voltage detected by the target voltage detecting circuit 32, as indicated at step 102. Then, the voltage regulating circuit 33 outputs the duty signal indicative of the duty of the on/off operation of the power transistor 11 to the PWM signal transmitting circuit 36, as indicated at step 103.

The warning circuit 34 determines if the generator 2 is in a fault condition, as indicated at step 104. If it is, then the frequency determining circuit 35 newly determines the frequency of the PWM signal to be sent to the ECU 80 based on the warning signal outputted from the warning circuit 34, as indicated at step 105. Otherwise, the frequency determining circuit 35 keeps the frequency of the PWM signal at a default value of f.

The PWM signal transmitting circuit 36 generates the PWM signal based on the duty signal outputted from the voltage regulating circuit 33 and the frequency signal outputted from the frequency determining circuit 35 and sends the PWM signal to the ECU 80, as indicated at step 106.

The I/O control unit 82 of the ECU 80 receives the PWM signal sent from the PWM signal transmitting circuit 36 of the control apparatus 3, as indicated at step 107. Then, the frequency detecting circuit 85 detects the frequency of the PWM signal, as indicated at step 108, and determines if the detected frequency is such a frequency to be indicative of a fault condition of the generator 2, as indicated at step 109. If this determination produces a "YES" answer, then the frequency detecting circuit 85 provides information about the detected frequency of the PWM signal to the fault condition type determining circuit 89, as indicated at step 110.

The fault condition type determining circuit 89 determines if the frequency of the PWM signal is equal to mf (here, m is an integer greater than 1), as indicated at step 111. If it is, then the fault condition type determining circuit 89 sends the average command signal to the duty averaging circuit 87, as indicated at step 112. Upon receiving the average command signal, the duty averaging circuit 87 averages the duty of the PWM signal for m cycles, as indicated at step 113.

The target voltage determining circuit 88 determines the target voltage necessary for the output voltage control of the generator 2 based on the duty of the PWM signal and various parameters represented by the sensing signals from the vehicle sensors, as indicated at step 114. Then, as indicated at step 115, the target voltage determining circuit 88 outputs the target voltage signal to the control apparatus 3 through controlling the on/off operation of the transistor 83 using the duty determined as a function of the target voltage and the specific frequency f.

The above processes as indicated at steps 100–115 will be repeated as long as the generator 2 generates electric power.

Figure 3:
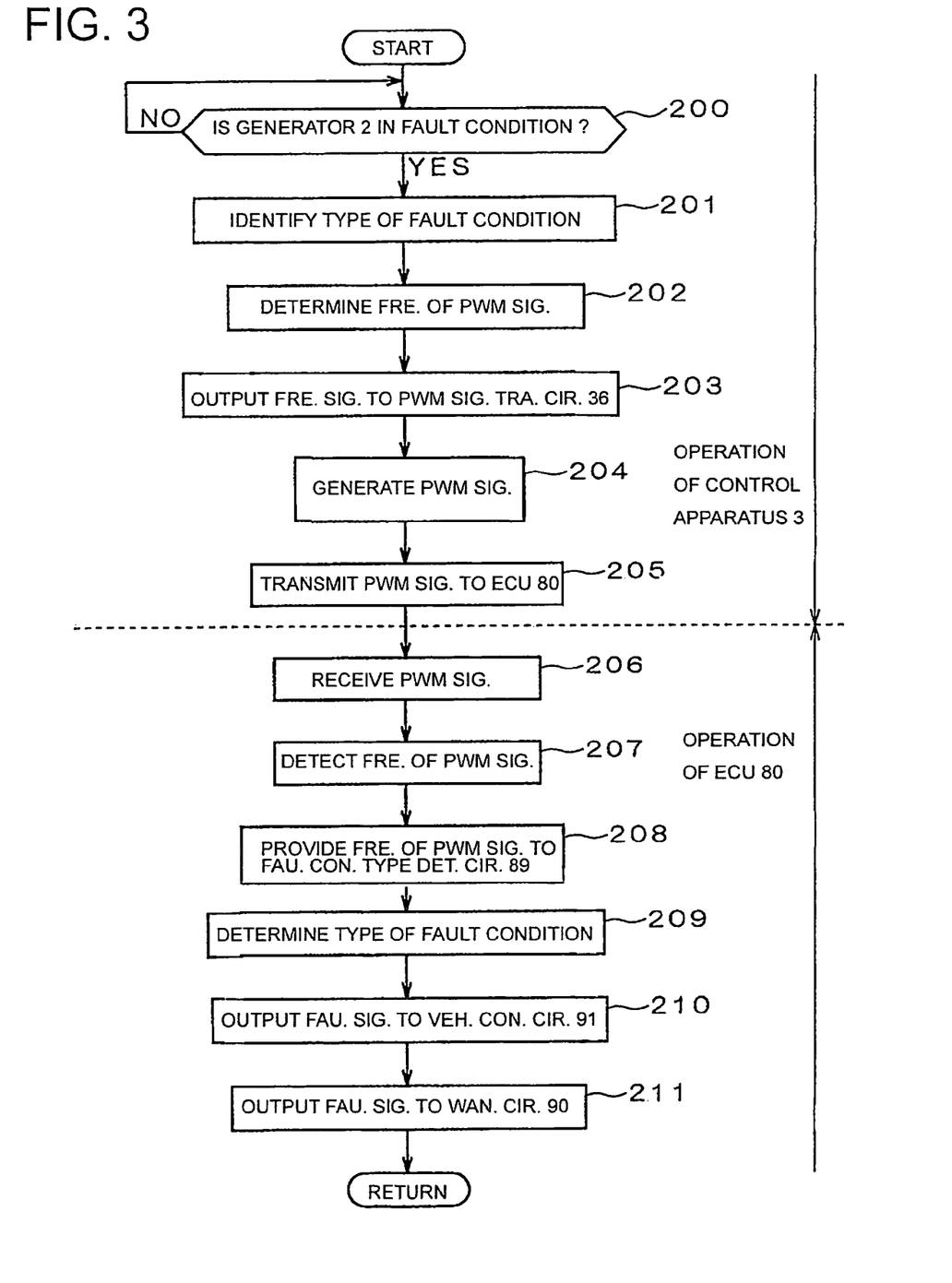
FIG. 3 is a flow chart illustrating a warning control for the electric power generation system of FIG. 1.

FIG. 3 illustrates the warning control for the electric power generation system 1.

The control apparatus 3 first starts to operate. Then, the warning circuit 34 in the control circuit 31 determines if the generator 2 is in a fault condition, as indicated at step 200. If it is, then the warning circuit 34 identifies the type of the fault condition, as indicated at step 201. Otherwise, this determination is repeated.

The frequency determining circuit 35 determines the frequency of the PWM signal to be sent to the ECU 80 based on the type of the fault condition identified by the warning circuit 34, as indicated at step 202. Then, the frequency determining circuit 35 outputs the frequency signal indicative of the determined frequency to the PWM signal transmitting circuit 36, as indicated at step 203.

The PWM signal transmitting circuit 36 generates the PWM signal based on the frequency signal outputted from the frequency determining circuit 35 and the duty signal outputted from the voltage regulating circuit 33, as indicated at step 204. Then, the PWM signal transmitting circuit 36 sends the generated PWM signal to the ECU 80, as indicated at step 205.

The I/O control unit 82 of the ECU 80 receives the PWM signal sent from the PWM signal transmitting circuit 36 of the control apparatus 3, as indicated at step 206. Then, the frequency detecting circuit 85 detects the frequency of the PWM signal, as indicated at step 207, and provides information about the detected frequency of the PWM signal to the fault condition type determining circuit 89, as indicated at step 208.

The fault condition type determining circuit 89 determines the type of the fault condition of the generator 2 based on the information about the frequency of the PWM signal provided by the frequency detecting circuit 85, as indicated at step 209. Then, the fault condition type determining circuit 89 outputs the fault signal indicative of the determined fault condition type to the vehicle controlling circuit 91, as indicated at step 210, so that the vehicle controlling circuit 91 can perform a suitable vehicle control depending on the type of the fault condition. The fault condition type determining circuit 89 also outputs the fault signal to the warning circuit 90, as indicated at step 211, so that the warning circuit 90 can light up the charge lamp 6, through switching on the transistor 84, depending on the type of the fault condition (for example, the stop of the electric power generation).

Figure 4:
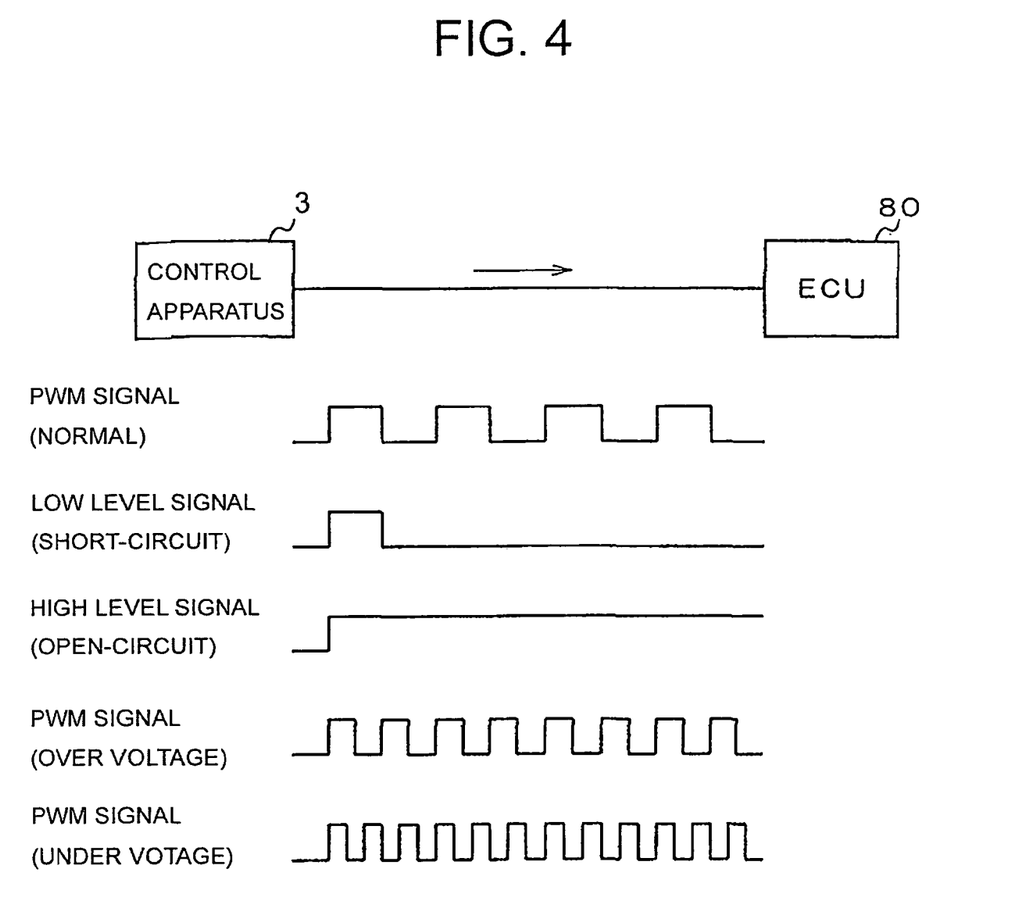
FIG. 4 is a view illustrating different types of signals, which an ECU of the electric power generation system of FIG. 1 may receive.

Referring now to FIG. 4, different types of signals, which the ECU 80 may receive, are comparatively illustrated.

The first signal is the PWM signal that is generated when the generator 2 is in normal condition. As described previously, the PWM signal has a duty equal to that of the on/off operation of the power transistor 11 and a frequency of f. Upon receiving this signal, the ECU 80 is informed of the duty of the on/off operation of the power transistor 11 and that the generator 2 is in normal condition.

The second signal is a low level signal that is generated when the signal line connecting the control apparatus 3 to the ECU 80 is short-circuited to the ground. Upon receiving this signal, the ECU 80 is informed of the short-circuit of the signal line.

The third signal is a high level signal that is generated when the signal line connecting the control apparatus 3 to the ECU 80 is open-circuited. Upon receiving this signal, the ECU 80 is informed of the open-circuit of the signal line.

The fourth signal is the PWM signal that is generated when the generator 2 is in a fault condition of over voltage. As described previously, the PWM signal has a duty equal to that of the on/off operation of the power transistor 11 and a frequency of 2f. Upon receiving this signal, the ECU 80 is informed of the duty of the on/off operation of the power transistor 11 and of the over voltage of the generator 2.

The fifth signal is the PWM signal that is generated when the generator 2 is in a fault condition of under voltage. As described previously, the PWM signal has a duty equal to that of the on/off operation of the power transistor 11 and a frequency of 3f. Upon receiving this signal, the ECU 80 is informed of the duty of the on/off operation of the power transistor 11 and of the under voltage of the generator 2.

Accordingly, it is easy to understand that the ECU 80 can accurately distinguish fault conditions of the generator 2 from those of the signal line.

Figure 5:
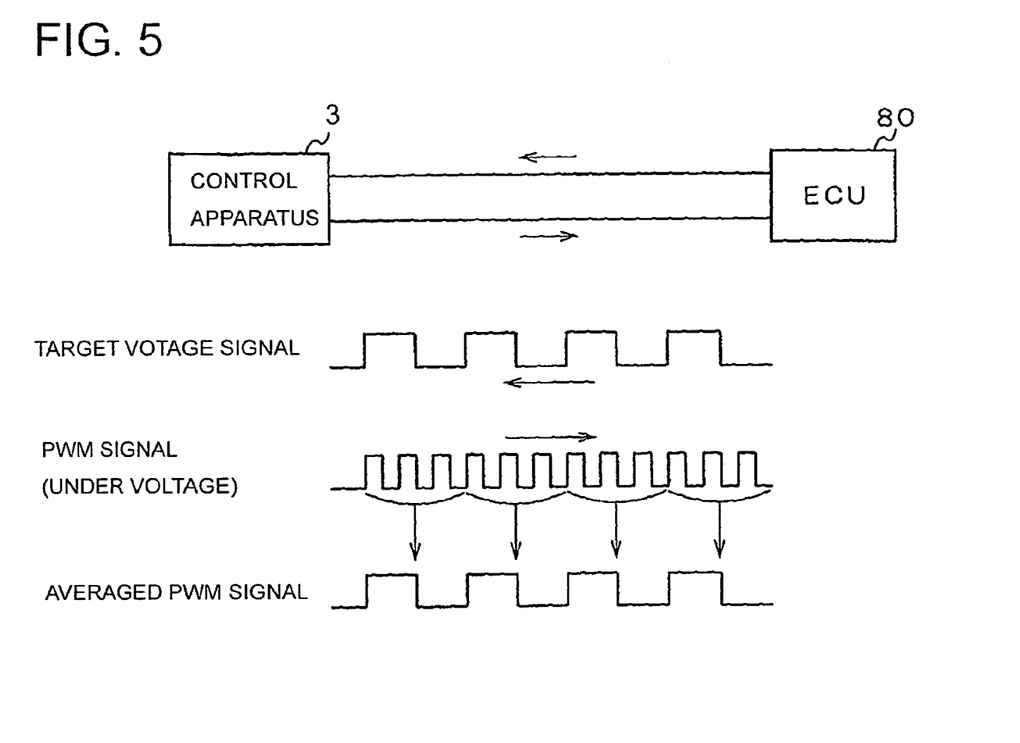
FIG. 5 is a view illustrating transmission of signals between a control apparatus and the ECU of the electric power generation system of FIG. 1 when a generator of the system is in a fault condition.

FIG. 5 illustrates transmission of signals between the control apparatus 3 and the ECU 80 when the generator 2 is in a fault condition, for example, of under voltage.

In the figure, the first signal is the target voltage signal sent from the ECU 80 to the control apparatus 3, which has the specific frequency of f, as described above.

The second signal is the PWM signal sent from the control apparatus 3 to the ECU 80, which has a frequency of 3f, as described above.

The third signal is a PWM signal that is obtained by averaging the duty of the second signal for three cycles and thus has a frequency of f.

As seen from FIG. 5, through averaging the PWM signal sent from the control apparatus 3 to the ECU 80, the timing for detecting the averaged duty of the PWM signal can be exactly synchronized (or matched) with that for transmitting the target voltage signal.

To sum up, in the electric power generation system 1 according to the present embodiment, the PWM signal sent from the control apparatus 3 to the ECU 80 has a duty equal to that of the on/off operation of the power transistor 11 and a frequency determined based on if a fault condition of the generator 2 is detected and the type of the fault condition if it is detected.

Consequently, it becomes possible for the control apparatus 3 to inform the ECU 80, which is an external control apparatus with respect to the control apparatus 3, of the duty of the on/off operation of the power transistor 11 and whether the generator 2 is in a fault condition using the single PWM signal.

Further, it also becomes possible for the ECU 80 to perform suitable vehicle controls based on the different types of fault conditions of the generator 2, which are determined based on the frequency of the PWM signal.

Furthermore, it also becomes possible for the ECU 80 to distinguish fault conditions of the generator 2 from those of the signal line through which the PWM signal is sent from the control apparatus 3 to the ECU 80.

Moreover, in the electric power generation system 1, the control apparatus 3 receives the target voltage signal sent from the ECU 80 and controls the on/off operation of the power transistor 11 so as to bring the output voltage of the generator 2 into agreement with the target voltage. Then, the control apparatus 3 sends to the ECU 80 the PWM signal, so that the ECU 80 can newly determine the target voltage based on the duty of the PWM signal (i.e., the duty of the on/off operation of the power transistor 11) and send to the control apparatus 3 the target voltage signal indicative of the newly-determined target voltage. By repeating such transmission of the target voltage signal and the PWM signal between the control apparatus 3 and the ECU 80, the electric power generation system 1 can operate with high stability.

Further, in the electric power generation system 1, the frequency of the PWM signal is so determined as to be m times that of the target voltage signal, where m is an integer greater than zero. Consequently, it becomes easy to synchronize the frequency of the PWM signal with that of the target voltage signal, thus improving the stability of the power electric generation system 1.

Furthermore, in the electric power generation system 1, the ECU 80 averages the duty of the PWM signal for m cycles, so that the timing for detecting the averaged duty of the PWM signal can be exactly synchronized with that for transmitting the target voltage signal, thus preventing delay in system control.

While the above particular embodiment of the invention has been shown and described, it will be understood by those who practice the invention and those skilled in the art that various modifications, changes, and improvements may be made to the invention without departing from the spirit of the disclosed concept.

For example, in the previous embodiment, the frequency of the PWM signal is so determined as to be m times that of the target voltage signal, where m is an integer greater than zero.

Figure 6:
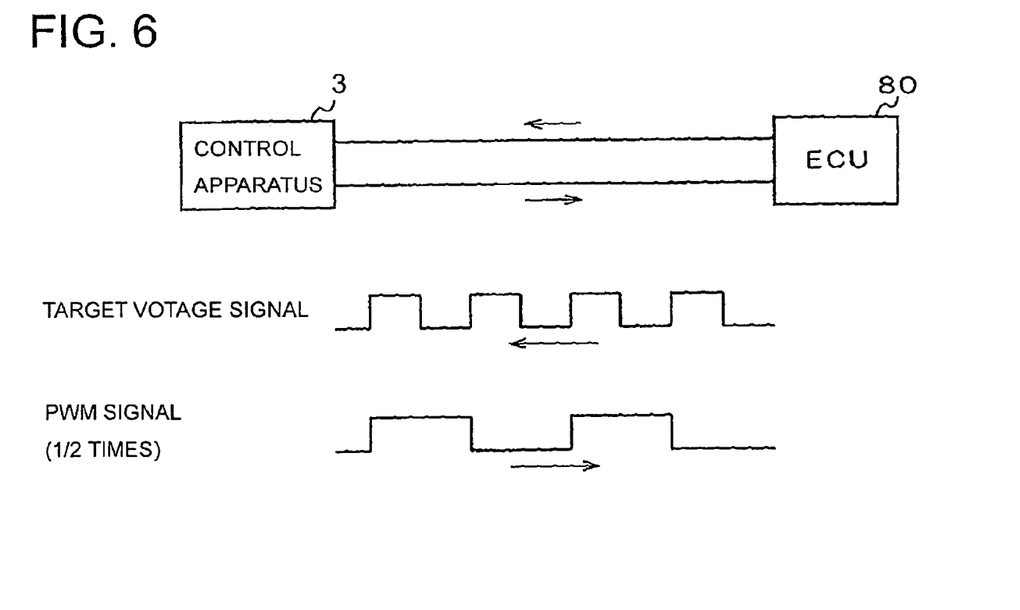
FIG. 6 is a view illustrating a PWM signal that has a frequency being ½ times that of a target voltage signal.

However, the frequency of the PWM signal may also be so determined as to be 1/n times that of the target voltage signal, where n is an integer greater than zero. FIG. 6 illustrates such a PWM signal that has a frequency being ½ times that of the target voltage signal. In this case, it is still easy to synchronize the frequency of the PWM signal with that of the target voltage signal, thus improving the stability of the power electric generation system.

Such modifications, changes, and improvements within the skill of the art are intended to be covered by the appended claims.

What is claimed is:

1. An electric power generation system for a vehicle comprising:
    a generator;
    a first control apparatus; and
    a second control apparatus that is electrically connected with said first control apparatus,
    wherein said first control apparatus includes:
    a switch configured to be selectively turned on and off so as to intermittently excite said generator;
    a regulator working to receive a target output signal, which has a specific frequency and is indicative of a target value of an output of said generator, and control on/off operation of said switch so as to bring the output of said generator into agreement with the target value;
    a fault condition detector working to detect a fault condition of said generator; and
    a Pulse-Width Modulated (PWM) signal generator working to generate and send to said second control apparatus a PWM signal that has a duty determined as a function of a duty of the on/off operation of said switch and a frequency determined based on whether the fault condition of said generator is detected by said fault condition detector,
    and wherein said second control apparatus includes a target output determiner working to receive the PWM signal sent from said PWM signal generator of said first control apparatus, determine the target value of the output of said generator based on the PWM signal, and generate and send to said regulator of said first control apparatus the target output signal.

2. The electric power generation system as set forth in claim 1, wherein said first control apparatus further includes a frequency determiner, and wherein
    said fault condition detector of said first control apparatus identifies a type of the fault condition of said generator if the fault condition is detected; and
    said frequency determiner determines the frequency of the PWM signal based on the type of the fault condition of said generator identified by said fault condition detector.

3. The electric power generation system as set forth in claim 2, wherein said second control apparatus further includes:
    a fault condition type determiner working to determine the type of the fault condition of said generator based on the frequency of the PWM signal sent from said PWM signal generator of said first control apparatus; and
    a vehicle controller working to control the vehicle based on the type of the fault condition of said generator determined by said fault condition type determiner.

4. The electric power generation system as set forth in claim 1, wherein the frequency of the PWM signal generated by said PWM signal generator of said first control apparatus is m times the frequency of the target output signal generated by said target output determiner of said second control apparatus, where m is an integer greater than zero.

5. The electric power generation system as set forth in claim 4, wherein said second control apparatus further includes a duty detector working to detect the duty of the on/off operation of said switch of said first control apparatus through averaging the duty of the PWM signal sent from said PWM signal generator of said first control apparatus for m cycles.

6. The electric power generation system as set forth in claim 1, wherein the frequency of the PWM signal generated by said PWM signal generator of said first control apparatus is 1/n times the frequency of the target output signal generated by said target output determiner of said second control apparatus, where n is an integer greater than zero.

* * * * *